United States Patent
Kessel

(10) Patent No.: US 11,321,253 B2
(45) Date of Patent: May 3, 2022

(54) INTERRUPT RATE LIMITER

(71) Applicant: NXP B.V., Eindhoven (NL)

(72) Inventor: Martin Kessel, Dresden (DE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/827,180

(22) Filed: Mar. 23, 2020

(65) Prior Publication Data

US 2021/0294764 A1 Sep. 23, 2021

(51) Int. Cl.
*G06F 13/24* (2006.01)
*G06F 9/30* (2018.01)

(52) U.S. Cl.
CPC .......... *G06F 13/24* (2013.01); *G06F 9/30101* (2013.01)

(58) Field of Classification Search
CPC ............................. G06F 13/24; G06F 9/30101
See application file for complete search history.

(56) References Cited

U.S. PATENT DOCUMENTS

| | | | |
|---|---|---|---|
| 8,478,923 B2 | 7/2013 | Dasari et al. | |
| 9,430,642 B2 | 8/2016 | Hepkin et al. | |
| 2005/0182879 A1* | 8/2005 | Vu | G06F 13/24 710/260 |
| 2008/0126618 A1* | 5/2008 | Pardo | G06F 13/26 710/48 |
| 2011/0016246 A1* | 1/2011 | Hiroki | G06F 9/4812 710/262 |
| 2011/0213906 A1* | 9/2011 | Gustafsson | G06F 13/24 710/262 |
| 2011/0219157 A1* | 9/2011 | Yamaguchi | G06F 13/24 710/267 |
| 2014/0359185 A1* | 12/2014 | Sawai | G06F 13/128 710/264 |
| 2016/0350162 A1* | 12/2016 | Schlagenhaft | G06F 11/0721 |
| 2017/0091013 A1* | 3/2017 | Tallam | G06F 11/0772 |
| 2020/0125396 A1* | 4/2020 | Chynoweth | B60K 35/00 |

* cited by examiner

*Primary Examiner* — Henry Tsai
*Assistant Examiner* — Harry Z Wang

(57) ABSTRACT

An interrupt rate limiter limits the rate of interrupt signals being transmitted from a first node to a second node of a computer system. In certain implementations, a first logic block compares an accumulator value to a threshold value to determine whether to (i) block an interrupt signal received from the first node from reaching the second node or (ii) allow the interrupt signal to reach the second node, an accumulator register stores the accumulator value, which is (i) increased whenever the first logic block allows an interrupt signal to reach the second node and (ii) otherwise periodically decreased, a summation node receives the accumulator value and one or more values that determine whether the accumulator value is to be increased or decreased, and a second logic block determines whether to increase or decrease the accumulator value based on whether an interrupt signal has been transmitted to the second processor.

9 Claims, 3 Drawing Sheets

INTERRUPT RATE LIMITER

TECHNICAL FIELD

The present disclosure is related to electronics and more particularly to interrupt processing between nodes in a computer system.

BACKGROUND

FIG. 1 is a simplified block diagram of a portion of a prior-art computer system 100 having two processors 110 and 130 interconnected by an interrupt line 115 that enables the first processor 110 to transmit an interrupt signal over the interrupt line 115 to the second processor 130 to interrupt the normal processing of the second processor 130 and possibly instruct the second processor 130 to perform some other processing instead. Such interrupt processing is standard in many computer systems. There are instances, however, either malicious in a denial of service attack or innocent due to some unintentional operational error, when the first processor 110 transmits too many interrupt signals to the second processor 130, resulting in the second processor 130 being unable to perform its normal processing in a reasonable amount of time or even at all. It is desirable to provide a solution to such undesirable instances of interrupt processing.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
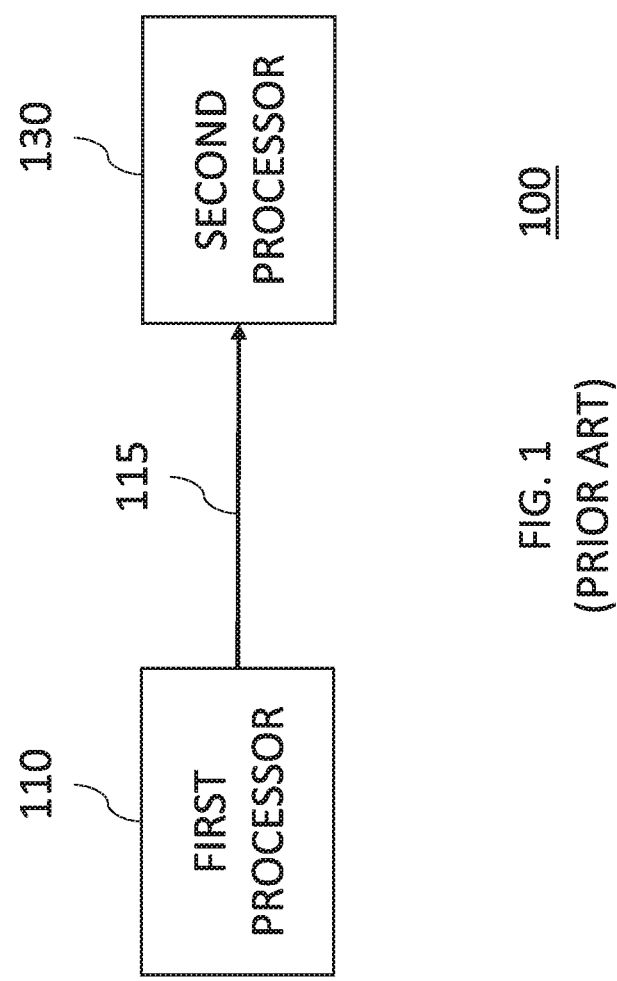
FIG. 1 is a simplified block diagram of a portion of a prior-art computer system.
Figure 2:
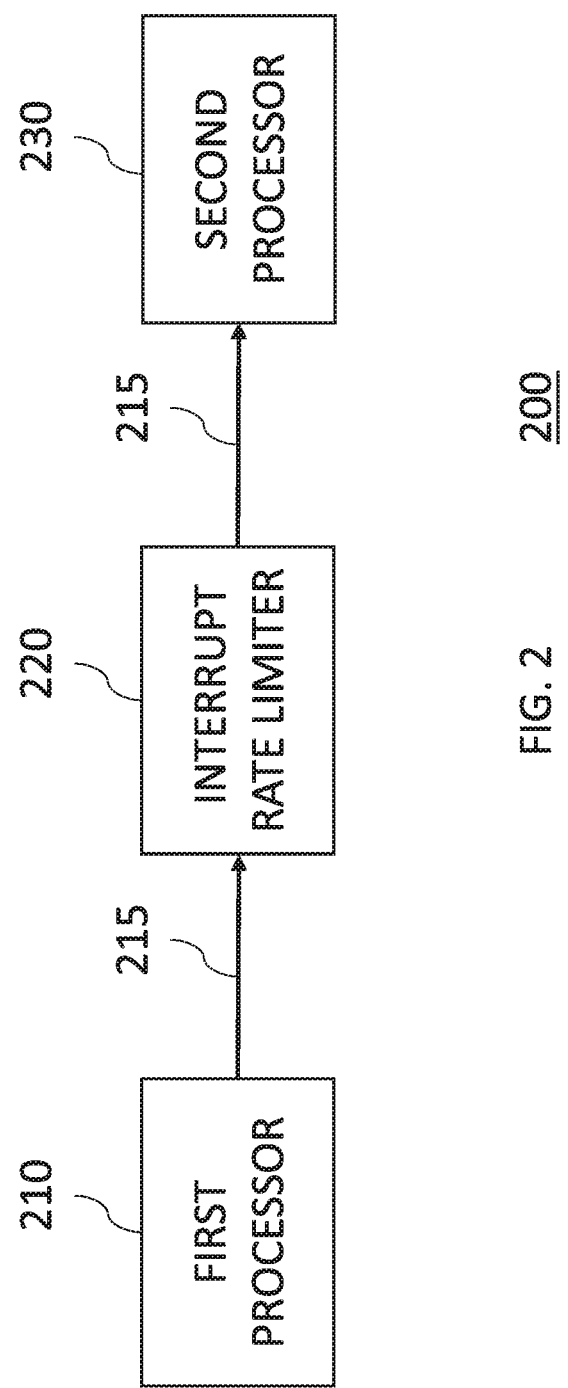
FIG. 2 is a simplified block diagram of a portion of a computer system 200 according to certain embodiments of the present disclosure.

FIG. 2 is a simplified block diagram of a portion of a computer system 200 according to certain embodiments of the present disclosure. As shown in FIG. 2, computer system 200 has two processors 210 and 230 that are analogous to the processors 110 and 130 of FIG. 1. In addition, computer system 200 includes an interrupt rate limiter 220 interposed along the interrupt line 215 from the first processor 210 to the second processor 230. As explained in further detail below, the interrupt rate limiter 220 receives the interrupt signals transmitted from the first processor 210 along the interrupt line 215 and determines which of those interrupt signals to allow to be applied to the second processor 230 in a manner that prevents the second processor 230 from receiving too many interrupt signals in too short a time period.

Figure 3:
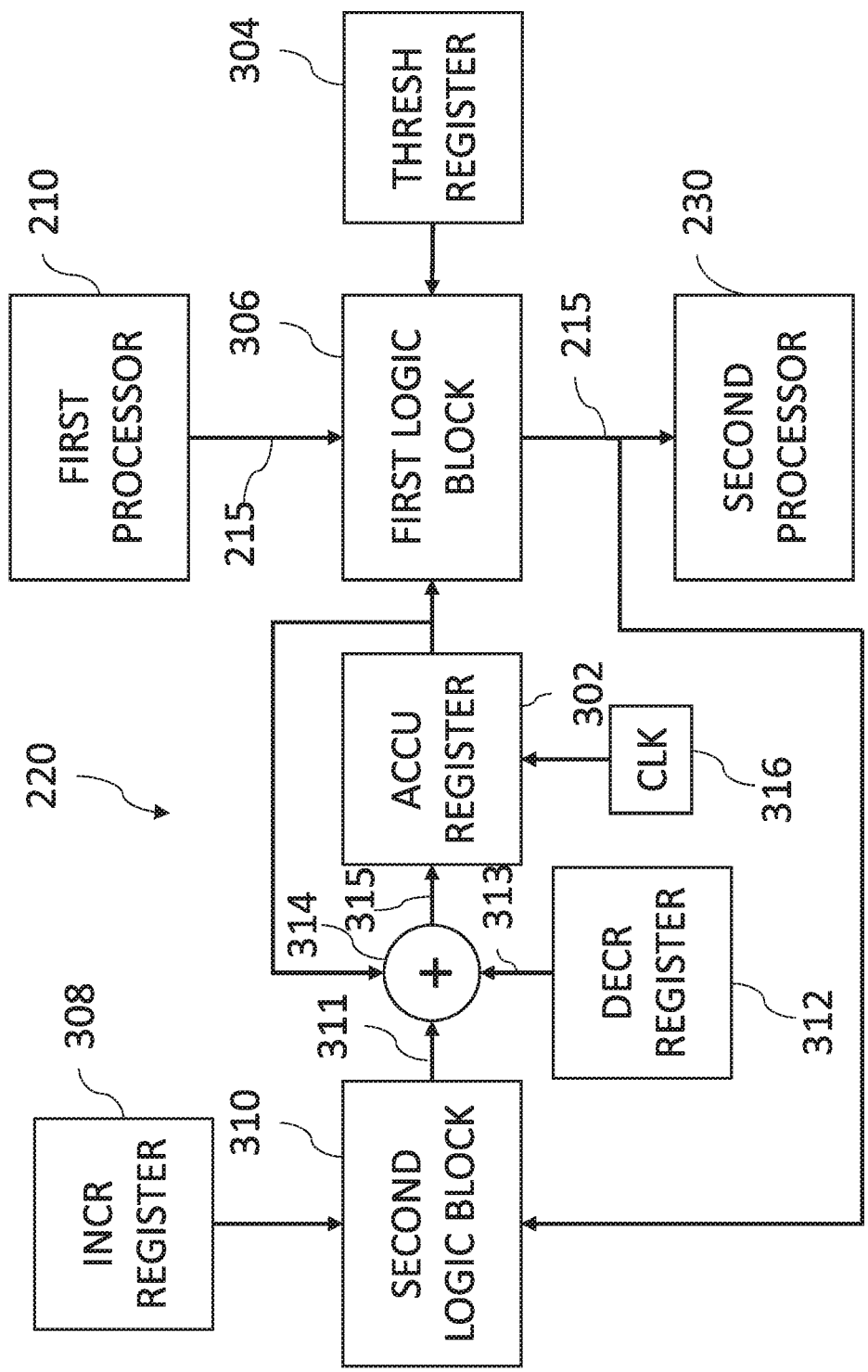
FIG. 3 is a block diagram showing details of the interrupt rate limiter of FIG. 2 according to one possible implementation.

FIG. 3 is a block diagram showing details of the interrupt rate limiter 220 of FIG. 2 according to one possible implementation. As shown in FIG. 3, the interrupt rate limiter 220 has an accumulator register 302 that stores an accumulator value Accu, a programmable threshold register 304 that stores a threshold value Thresh, and a first logic block 306 that compares Accu to Thresh. If Accu is less than Thresh, then the first logic block 306 will allow an interrupt signal received from the first processor 210 to be forwarded to the second processor 230; otherwise, the first logic block 306 will block the interrupt signal from reaching the second processor 230.

In addition, the interrupt rate limiter 220 has a programmable increment register 308 that stores an increment value Incr, a second logic block 310, a decrement register 312 that stores a decrement value 313 equal to −1, a summation node 314, and a clock 316. Note that, in alternative embodiments, the clock 316 may be external to the interrupt rate limiter 220. The summation node 314 receives and sums the accumulator value Accu, the decrement value −1, and a value 311 from the second logic block 310 to generate a summation value 315. If and when the first logic block 306 enables an interrupt signal to be transmitted to the second processor 230, the second logic block 310 applies the increment value Incr to the summation node 314 as the value 311; otherwise, the second logic block 310 applies the value 0 to the summation node 314 as the value 311. At every clock cycle of the clock 316, the accumulator value Accu in the accumulator register 302 is updated based on the summation value 315.

Thus, when the first logic block 306 allows an interrupt signal to be transmitted to the second processor 230, the accumulator value Accu is increased by (Incr−1) at the next clock cycle. For every other clock cycle, the accumulator value Accu is decremented by one. Note that the accumulator value Accu is prevented from going below 0. In some implementation, the Accu is also prevented from exceeding a programmable maximum value. In this way, based on the values selected for Thresh and Incr, the interrupt rate limiter 220 is able to limit the rate of interrupt signals from the first processor 210 reaching the second processor 230. If too many interrupt signals arrive at the interrupt rate limiter 220 in too short a time period, the accumulator value Accu will reach and exceed the threshold value Thresh and additional interrupt signals will be blocked until Accu is decremented enough times to again fall below Thresh. As long as the interrupt signals arrive at a sufficiently low rate, Accu will never reach Thresh, and all of the interrupt signals will be sent to the second processor 230.

In some implementations, the first logic block 306 will be configured to transmit an interrupt signal to the second processor 230 as soon as Accu transitions from being greater than or equal to Thresh to being below Thresh. In other implementations, the second logic block 310 will wait until the next interrupt signal arrives from the first processor 210 before interrupting the second processor 230.

In an alternative embodiment of the interrupt rate limiter 220, the decrement register 312 is eliminated, and the second logic block 310 is configured to apply a value of −1 instead of 0 for clock cycles that are not associated with interrupt signals being transmitted to the second processor 230. Note that, for this embodiment to function identical to the embodiment of FIG. 3, the increment value Incr should be decreased by 1.

Although the disclosure has been described in the context of the interrupt rate limiter 220 of FIG. 3, those skilled in the art will understand that there are other ways of implementing interrupt rate limiters of the disclosure. In general, certain interrupt rate limiters of the disclosure maintain a value in a memory or register, adjust that value up or down depending on whether or not an interrupt signal is received from a first processor, and threshold the value to determine whether to allow a current interrupt signal to be applied to a second processor. Those skilled in the art will understand that such an interrupt rate limiter can be implemented using the implementation of FIG. 3 or suitable alternative implementations, such as (without limitation) implementations involving a first-order low-pass filter.

Although the disclosure has been described in the context of computer system 200 of FIG. 2 having the interrupt rate limiter 220 distinct from the second processor 230, in alternative implementations, the interrupt rate limiter 220 can be integrated into the second processor 230.

Although the disclosure has been described in the context of computer system 200 having processors 210 and 230, the disclosure also includes computer systems having other types of nodes, where each node may be a processor or other suitable device that transmits and/or receives interrupt signals such as a semaphore, mutex, DMA, etc. Furthermore, although FIG. 2 shows the first processor 210 transmitting interrupt signals to the second processor 230, in other implementations, the second processor 230 may also transmit interrupt signals to the first processor 210 via a different interrupt line with a different instance of the interrupt rate limiter 220 interposed along that interrupt line. Furthermore, computer systems of the disclosure may have one or more additional nodes with one or more additional interrupt lines and corresponding additional interrupt rate limiters to and/or from the first and/or second processors 210 and 230 and/or between themselves.

According to certain embodiments, the disclosure describes an article of manufacture comprising an interrupt rate limiter (e.g., 220) configured to be connected between first and second nodes (e.g., 210 and 230) of a computer system (e.g., 200) to limit the rate of interrupt signals being transmitted from the first node to the second node.

According to some or all of the above embodiments, the interrupt rate limiter comprises a first logic block (e.g., 306) configured to compare an accumulator value (e.g., Accu) to a threshold value (e.g., Thresh) to determine whether to (i) block an interrupt signal received from the first node from reaching the second node or (ii) allow the interrupt signal to reach the second node.

According to some or all of the above embodiments, the interrupt rate limiter further comprises an accumulator register (e.g., 302) that stores the accumulator value, wherein the accumulator value is (i) increased whenever the first logic block allows an interrupt signal to reach the second node and (ii) otherwise periodically decreased.

According to some or all of the above embodiments, the interrupt rate limiter further comprises a summation node (e.g., 314) that receives the accumulator value and one or more values (e.g., 311, 313) that determine whether the accumulator value is to be increased or decreased.

According to some or all of the above embodiments, the interrupt rate limiter further comprises a second logic block (e.g., 310) that determines whether to increase or decrease the accumulator value based on whether an interrupt signal has been transmitted to the second processor.

According to some or all of the above embodiments, the interrupt rate limiter is distinct from the second node.

According to some or all of the above embodiments, the article further comprises the first node and/or the second node.

According to certain embodiments, the disclosure describes a method for limiting the rate of interrupt signals being transmitted from a first node to a second node in a computer system, the method comprising (a) comparing an accumulator value (e.g., Accu) to a threshold value (e.g., Thresh); and (b) based on the comparison, either (i) blocking an interrupt signal received from the first node from reaching the second node or (ii) allowing the interrupt signal to reach the second node.

According to some or all of the above embodiments, the method further comprises (c) increasing the accumulator value whenever an interrupt signal is allowed to reach the second node; and (d) periodically decreasing the accumulator value.

According to some or all of the above embodiments, step (b) further comprises determining whether to perform step (c) or step (d) based on whether an interrupt signal has been transmitted to the second processor.

It is further noted that the functional blocks, components, systems, devices, or circuitry described herein can be implemented using hardware, software, or a combination of hardware and software along with analog circuitry as needed. For example, the disclosed embodiments can be implemented using one or more integrated circuits that are programmed to perform the functions, tasks, methods, actions, or other operational features described herein for the disclosed embodiments. The one or more integrated circuits can include, for example, one or more processors or configurable logic devices (CLDs) or a combination thereof. The one or more processors can be, for example, one or more central processing units (CPUs), controllers, microcontrollers, microprocessors, hardware accelerators, ASIC s (application specific integrated circuit), or other integrated processing devices. The one or more CLDs can be, for example, one or more CPLDs (complex programmable logic devices), FPGAs (field programmable gate arrays), PLAs (programmable logic array), reconfigurable logic circuits, or other integrated logic devices. Further, the integrated circuits, including the one or more processors, can be programmed to execute software, firmware, code, or other program instructions that are embodied in one or more non-transitory tangible computer-readable mediums to perform the functions, tasks, methods, actions, or other operational features described herein for the disclosed embodiments. The integrated circuits, including the one or more CLDs, can also be programmed using logic code, logic definitions, hardware description languages, configuration files, or other logic instructions that are embodied in one or more non-transitory tangible computer-readable mediums to perform the functions, tasks, methods, actions, or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. An interrupt rate limiter configured to be connected between a first processor and a second processor of a computer system to limit a rate of interrupt signals being sequentially transmitted from the first processor to the second processor, wherein the interrupt rate limiter comprises:
    a first logic block configured to compare an accumulator value to a threshold value, wherein the accumulator value is updated at every clock cycle, to determine whether to (i) block a current interrupt signal received from the first processor from reaching the second processor or (ii) allow the current interrupt signal to reach the second processor, wherein the first logic block is configured to block the current interrupt signal from reaching the second processor after the accumulator value is greater than the threshold value; and
    an accumulator register configured to store the accumulator value, wherein the accumulator value is (i) increased by a specified increment value whenever the first logic block allows the current interrupt signal to reach the second processor and (ii) otherwise periodically decreased by a specified decrement value without resetting the accumulator value to zero if after the accumulator value is greater than the specified decrement value.

2. The interrupt rate limiter of claim 1, further comprising:
    a summation processor configured to receive the accumulator value and one or more values that determine whether the accumulator value is to be increased or decreased.

3. The interrupt rate limiter of claim 2, further comprising:
    a second logic block configured to determine whether to increase or decrease the accumulator value based on whether the current interrupt signal has been transmitted to the second processor.

4. The interrupt rate limiter of claim 1, wherein the interrupt rate limiter is distinct from thesecond processor.

5. The interrupt rate limiter claim 1, further comprising the first processor.

6. The interrupt rate limiter claim 5, further comprising the second processor.

7. The interrupt rate limiter claim 1, further comprising the second processor.

8. A method for limiting the rate of interrupt signals being sequentially transmitted from a first processor to a second processor in a computer system, the method comprising:
    (a) comparing an accumulator value to a threshold value, wherein the accumulator value is updated at every clock cycle;
    (b) based on the comparison, either (i) blocking a current interrupt signal received from the first processor from reaching the second processor or (ii) allowing the current interrupt signal to reach the second processor, wherein the current interrupt signal is blocked after the accumulator value is greater than thethreshold value;
    (c) increasing the accumulator value by a specified increment value whenever the current interrupt signal is allowed to reach the second processor; and
    (d) periodically decreasing the accumulator value by a specified decrement value without resetting the accumulator value to zero after the accumulator value is greater than the specified decrement value.

9. The method of claim 8, wherein step (b) further comprises:
    determining whether to perform step (c) or step (d) based on whether the current interrupt signal has been transmitted to the second processor.

* * * * *